(12) United States Patent
Yuan et al.

(10) Patent No.: US 11,259,365 B2
(45) Date of Patent: Feb. 22, 2022

(54) METHOD AND SYSTEM FOR MULTIPLE WIRELESS CONNECTION OPTIMIZATION

(71) Applicant: CASSIA NETWORKS INC., San Jose, CA (US)

(72) Inventors: Daling Yuan, Beijing (CN); Yong Meng, Beijing (CN)

(73) Assignee: CASSIA NETWORKS INC., San Jose, CA (US)

( * ) Notice: Subject to any disclaimer, the term of this patent is extended or adjusted under 35 U.S.C. 154(b) by 0 days.

(21) Appl. No.: 16/925,079

(22) Filed: Jul. 9, 2020

(65) Prior Publication Data

US 2022/0015191 A1 Jan. 13, 2022

(51) Int. Cl.
*H04W 4/00* (2018.01)
*H04W 88/16* (2009.01)
*H04W 24/02* (2009.01)
*H04W 4/80* (2018.01)
*H04W 48/16* (2009.01)

(52) U.S. Cl.
CPC .............. *H04W 88/16* (2013.01); *H04W 4/80* (2018.02); *H04W 24/02* (2013.01); *H04W 48/16* (2013.01)

(58) Field of Classification Search
CPC .......... H04Q 88/16; H04Q 24/02; H04Q 4/80; H04Q 48/16
See application file for complete search history.

(56) References Cited

U.S. PATENT DOCUMENTS

| 10,149,340 | B1* | 12/2018 | Rabii | G06F 3/03543 |
| 2016/0182803 | A1* | 6/2016 | Song | H04N 5/23206 |
| | | | | 348/211.2 |
| 2018/0199397 | A1* | 7/2018 | Skillermark | H04W 76/27 |
| 2019/0215673 | A1* | 7/2019 | Choi | H04L 47/20 |
| 2019/0387382 | A1* | 12/2019 | Wojcieszak | H04W 72/1215 |

OTHER PUBLICATIONS

International Search Report and Written Opinion for Application No. PCT/US2021/040779, dated Aug. 4, 2021, 6 pages.

* cited by examiner

*Primary Examiner* — Erika A Washington

(57) ABSTRACT

A method for managing one or more wireless connections includes: conducting a plurality of scan operations and a plurality of connection operations. Each scan operation is conducted within one of a plurality of scan windows, and each connection operation is conducted within one of a plurality of connection windows. The scan windows and the connection windows do not overlap with each other. Consecutive scan windows are separated by a scan interval, which is a first integer multiplication of a minimum interval, and consecutive connection windows are separated by a connection interval, which is a second integer multiplication of the minimum interval. When a new wireless connection is added or an existing wireless connection is removed, the link positions corresponding to wireless connections are adjusted to provide balanced distribution of time slot resource for the wireless connections.

18 Claims, 8 Drawing Sheets

METHOD AND SYSTEM FOR MULTIPLE WIRELESS CONNECTION OPTIMIZATION

TECHNICAL FIELD

This application relates generally to wireless communication technologies, and more specifically, to method and system for managing multiple wireless connections.

BACKGROUND

In many wireless connection applications, a wireless gateway needs to manage multiple wireless connections. More specifically, Bluetooth technology is one of the wireless connection technologies that has been extensively implemented in electronic devices. It allows wirelessly exchanging of data between electronic devices within a short distance. Wireless connections through Bluetooth technology are free to use, have low power consumption, and are robust against interferences from other wireless connections. As a result, Bluetooth technology has been widely adopted in many products such as headphones, keyboards and mice, printers, car systems, and surveillance cameras. With rapid adaptation of Bluetooth technology, in more and more applications, a Bluetooth gateway may need to simultaneously manage multiple Bluetooth connections.

For a wireless gateway managing multiple Bluetooth connections, the number of simultaneous connections, the stability of each individual connection, and the throughput of each individual connection are key specifications to evaluate its performance. Existing methods and apparatuses for managing multiple Bluetooth connections have several shortcomings. For example, in a traditional Bluetooth gateway, the number of connections in actual applications rarely reaches its claimed capacity. For a gateway that theoretically can manage 20 connections simultaneously, when the connection number is relatively large (e.g., 10 connections), existing connections become unstable, and establishing a new connection becomes difficult, if possible at all. The throughputs of individual connections may vary substantially, and removing some connections may not ameliorate the imbalance. Additionally, in a traditional gateway, the throughput of individual connection is difficult to estimate. Therefore, a wireless connection management method that can address the foregoing limitations is desired.

SUMMARY

In view of the aforementioned limitations of existing technologies, this disclosure presents method and system for managing one or more wireless connections that address these limitations. Various embodiments of the present disclosure may include systems, methods, and non-transitory computer readable media for managing one or more wireless connections.

One aspect of this disclosure is directed to a time division multiplexing method for managing one or more wireless connections, applicable to a wireless gateway such as a Bluetooth gateway. The method may include: conducting, by the wireless gateway, a plurality of scan operations and a plurality of connection operations. Each scan operation may be conducted within one of a plurality of scan windows each having a scan window size, and each connection operation may be conducted within one of a plurality of connection windows each having a connection window size. The scan windows and the connection windows may be separated from each other. Consecutive scan windows may be separated by a scan interval, and consecutive connection windows may be separated by a connection interval. The scan interval may be a first integer multiplication of a base interval, and the connection interval may be a second integer multiplication of the base interval. Each connection window may include a plurality of link positions each corresponding to one of the one or more wireless connections.

In some embodiments, in the aforementioned method, the scan operations and the connection operations may be conducted alternately, and the scan interval may equal to the connection interval.

In some embodiments, in the aforementioned method, within each connection window, each of the plurality of link positions may have a same span size, and consecutive link positions may be separated by a same link separation. The conducting the connection operation within the connection window may include: conducting one or more link operations, each conducted at one of the plurality of link positions, causing the corresponding link position being occupied. Each link operation may correspond to one of the one or more wireless connections.

In some embodiments, in the aforementioned method, the conducting the scan operation within the scan window may include: conducting the scan operation to identify a new wireless connection. The conducting the connection operation within the connection window may further include: adding the new wireless connection. The new wireless connection may be added by: conducting a new link operation corresponding to the new wireless connection at one of the plurality of link positions that is not occupied; and adjusting the link positions for the link operations that have been conducted.

In some embodiments, in the aforementioned method, the adjusting the link positions for the link operations that have been conducted may include: adjusting the link positions so that operation intervals of the connection window are substantially the same. The operation intervals of the connection window may include intervals between consecutive link operations and an interval from the last link operation to the end of the connection window. Relative orders of the link operations may remain unchanged after the adjustment.

In some embodiments, in the aforementioned method, the adjusting the link positions for the link operations that have been conducted may further include: determining whether an adjustment period is greater than a time threshold and an adjustment counter is less than a counter threshold; and, in response to determining that the adjustment period is greater than the time threshold and the adjustment counter is less than the counter threshold, adjusting the link positions. The adjustment period may be a time period since the link positions are last adjusted, and the adjustment counter may be a number of link positions that have been adjusted.

In some embodiments, in the aforementioned method, the conducting the connection operation within the connection window may further include: removing one of the one or more wireless connections. The one or more wireless connections may be removed by: removing the link operation corresponding to the removed wireless connection; and adjusting link positions of the remaining link operations.

In some embodiments, in the aforementioned method, the adjusting link positions of the remaining link operations may include: adjusting the link positions so that operation intervals of the connection window are substantially the same. The operation intervals of the connection window include intervals between consecutive link operations as well as the interval from the last link operation to the end of the connection window. Relative orders of the link operations may remain unchanged after the adjustment.

In some embodiments, in the aforementioned method, the adjusting the link positions of the remaining link operations may further include: determining whether the adjustment period is greater than the time threshold and the adjustment counter is less than the counter threshold; and in response to determining that the adjustment period is greater than the time threshold and the adjustment counter is less than the counter threshold, adjusting the link positions of the remaining link operations.

Another aspect of this disclosure is directed to a wireless gateway. The wireless gateway may include a processor and a memory configured to store computer instruction executable by the processor to cause the processor to perform: conducting a plurality of scan operations and a plurality of connection operations. Each scan operation may be conducted within one of a plurality of scan windows each having a scan window size, and each connection operation may be conducted within one of a plurality of connection windows each having a connection window size.

The scan windows and the connection windows may be separated from each other. Consecutive scan windows may be separated by a scan interval, and consecutive connection windows may be separated by a connection interval. The scan interval may be a first integer multiplication of a base interval, and the connection interval may be a second integer multiplication of the base interval. Each connection window may include a plurality of link positions each corresponding to one of the one or more wireless connections.

Another aspect of this disclosure is directed to a non-transitory computer-readable storage medium storing a computer program. Upon being executed by a processor, the computer program may cause the processor to perform the time divisional multiplexing method for managing one or more wireless connections, as described in any one of the aforementioned embodiments.

In the method for managing one or more wireless connection disclosed herein, the scan operations and the connection operations are performed in their respective operation windows that are separated from each other, and each individual connection is assigned substantially same time slot resource within the connection window. Thus, the interference between the scan operation and the connection operation may be minimized, and the accessibilities of individual connections are maintained substantially consistent. Additionally, when a new connection is added or an existing connection is removed, the link positions corresponding to the connections are adjusted to provide substantial balance distribution of the time slot resource for each individual connection. Thus, the performances of individual connections are maintained consistent, and the throughput of each individual connection can be accurately estimated.

These and other features of the systems, methods, and non-transitory computer-readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings.

DETAILED DESCRIPTION

Specific, non-limiting embodiments of the present invention will now be described with reference to the drawings. Particular features and aspects of any embodiment disclosed herein may be used and/or combined with particular features and aspects of any other embodiment disclosed herein. It should be understood that such embodiments are by way of example and are merely illustrative of a number of embodiments within the scope of the present invention. Various changes and modifications obvious to one skilled in the art to which the present invention pertains are deemed to be within the spirit, scope and contemplation of the present invention as further defined in the appended claims.

Methods and systems for managing one or more wireless connections will be described in details below. For ease of description, in this disclosure, examples associated with wireless technology will be used to illustrate this invention. This invention may be applicable to wireless connection technologies, including but not limited to, Bluetooth, Wi-Fi connection, fourth generation (4G) cellular network connection, fifth generation (5G) cellular network connection.

Figure 1:
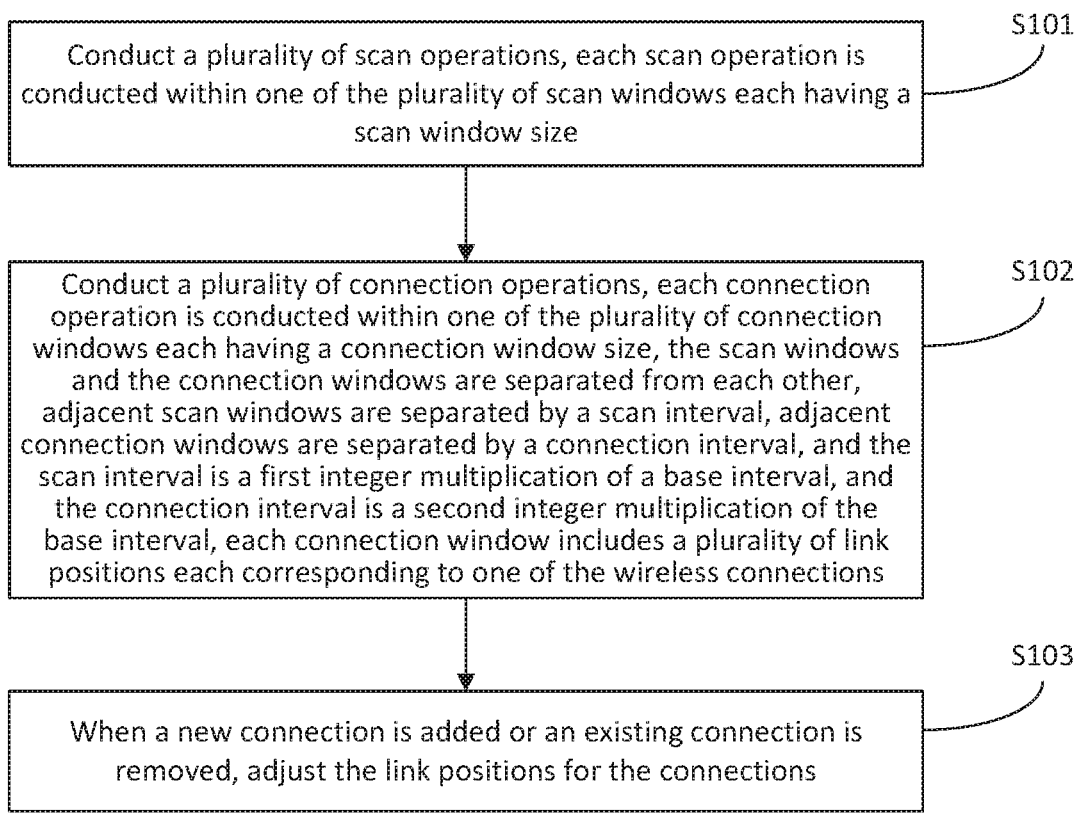
FIG. 1 shows a flowchart illustrating a method for managing one or more wireless connections in accordance with one embodiment of this disclosure.

FIG. 1 shows a flowchart illustrating a method for managing one or more wireless connections in accordance with one embodiment of this disclosure. For example, the method may be a time division multiplexing method and may be applicable to a Bluetooth gateway. Referring to FIG. 1, the method may include the following steps S101 through S102.

In step S101, a plurality of scan operations may be conducted. Each scan operation may be conducted within one of the plurality of scan windows each having a scan window size. The scan operation may be conducted to search for an available new wireless connection between the wireless gateway and a wireless device.

In some examples, the wireless gate way may be a Bluetooth gateway, which may be a Bluetooth network hardware used for managing connections from one or more Bluetooth devices. The Bluetooth gateway may manage Bluetooth connections of the Bluetooth devices within an office or a home. In this disclosure, "Bluetooth device" may refer to a device that is capable of establishing a Bluetooth connection with a gateway. For example, a Bluetooth device may include, but not be limited to, a mobile phone, a laptop computer, a headphone, or a navigation device.

In step S102, a plurality of connection operations may be conducted. Each connection operation may be conducted within one of the plurality of connection windows each having a connection window size. The scan windows and the connection windows may be separated from each other to ensure that interference between the scan operations and the connection operations is minimized. In this disclosure, a "window" may refer to a time interval, and two windows are considered "separated from each other" if the time interval corresponding to one of the two windows occurs earlier than the time interval corresponding to the other window. However, it is possible that the end time of the earlier time interval may coincide with the start time of the latter interval.

Consecutive scan windows may be separated by a scan interval, and consecutive connection windows may be separated by a connection interval. The scan interval may be a first integer multiplication of a base interval, and the connection interval may be a second integer multiplication of the base interval. Each connection window may include a plurality of link positions each corresponding to one of the one or more wireless connections. In this disclosure, the "scan interval" is a time interval between the start times of two consecutive scan windows, the "connection interval" is a time interval between the start times of two consecutive connection windows, and a "link position" is referred to a time interval within a connection window.

In some embodiments, the method may further include step S103, as shown in FIG. 1. In step S103, when a new connection is added or an existing connection is removed, the link positions for the connections may be adjusted. Details of this step will be described hereinafter.

Figure 2:
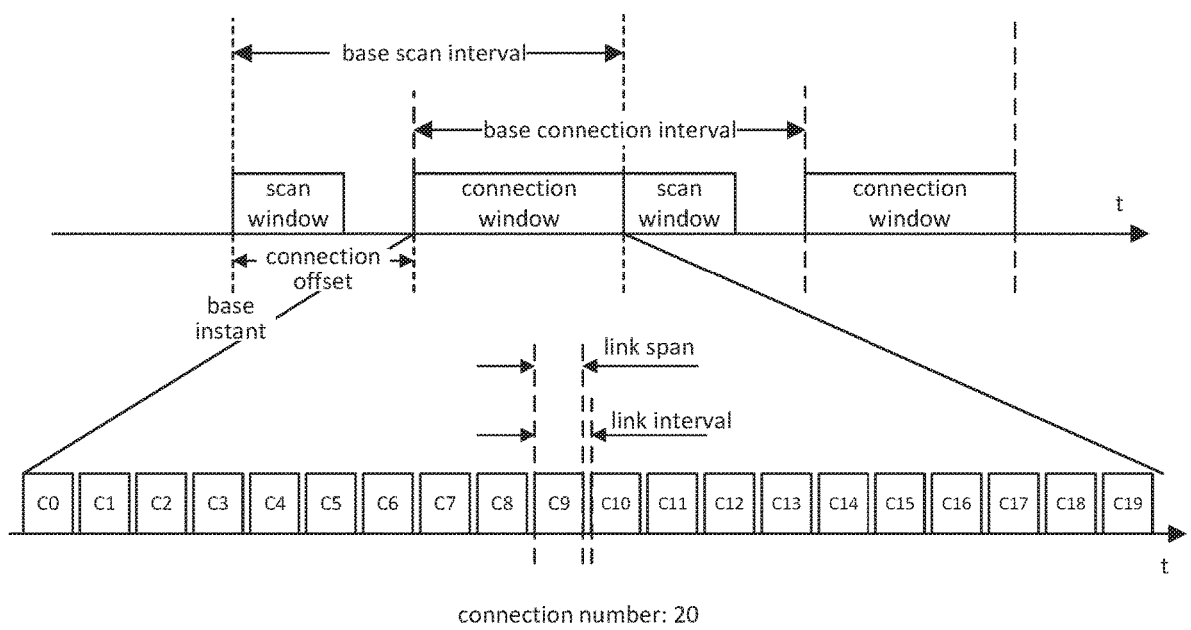
FIG. 2 shows a timing diagram illustrating static parameters for a method for managing one or more wireless connections in accordance with one embodiment of this disclosure.

FIG. 2 shows a timing diagram illustrating static parameters for the method for managing one or more wireless connections. In this disclosure, the static parameters are a basic set of parameters for connection management. Actual working parameters may derived from the static parameters but no necessary be the same as static parameters.

In the example shown in FIG. 2, the scan operations and the connection operations may be conducted alternately. That is, a scan window, in which a scan operation is conducted may be followed by a connection window, in which a connection operation is conducted. The connection window may be further followed by another scan window, which is followed by yet another connection window, so on and so forth. As shown in FIG. 2, the scan windows and the connection windows are separated from each other, and the scan interval for consecutive scan windows ("base scan interval" in FIG. 2) may equal to the connection interval for consecutive connection windows ("base connection interval" in FIG. 2). The first scan window may start at a base point ("base instant" shown in FIG. 2), and the first connection window may be set at a "connection offset" behind the "base instant", as shown in FIG. 2.

As shown in FIG. 2, in each connection window, each of the plurality of link positions may span the same time interval ("link span" shown in FIG. 2), and consecutive link positions may be separated by the same time interval ("link interval" shown in FIG. 2). In the example of FIG. 2, it is assumed that wireless gateway can simultaneously manage twenty (20) wireless connections, therefore a connection window includes twenty link positions. Apparently, this disclosure is not limited to this example, a connection window may include other number of link positions (e.g., 5, 10, 15, etc.) according to actual needs.

The wireless gateway may support multiple wireless connections simultaneously. Thus, each of the plurality of link positions in the connection window may correspond to one connection, and the number of link positions in the connection window may equal to the maximum number of the connections the wireless gateway can manage. Correspondingly, the connection operation conducted within a connection window may include one or more link operations, each conducted at one of the plurality of link positions. Each link operation may correspond to one of the wireless connections the wireless gateway is managing.

Each of the link positions may be in one of "occupied" or "unoccupied" status, depending on whether a link operation is conducted at the link position. That is, a link position is in an "occupied" status if a link operation is conducted at this link position, and in an "unoccupied" status if no link operation is conducted at this link position. When a new wireless connection is established, the link operation corresponding to this new connection will be performed at an "unoccupied" link position, changing the status of that link position to "occupied".

The specific values of the aforementioned static parameters can be determined based on actual needs, and this disclosure is not limited in this regard. In one example, the wireless gateway may be a Bluetooth gateway, and a slot time of 625 μs (a "Slot") in the Bluetooth protocol may be used as a time unit, and all the aforementioned static parameters may be set to be an integer multiplication of the time unit. For example, the specific values of the static parameters shown in FIG. 2 can be set as those shown in Table 1.

TABLE 1

| static parameters | | |
|---|---|---|
| | Time (ms) | Slot(s) |
| base scan interval | 40 | 64 |
| scan window | 12.5 | 20 |
| base connection interval | 40 | 64 |
| connection window | 25 | 40 |
| connection offset | 15 | 24 |
| link interval | 1.25 | 2 |

Figure 3A:
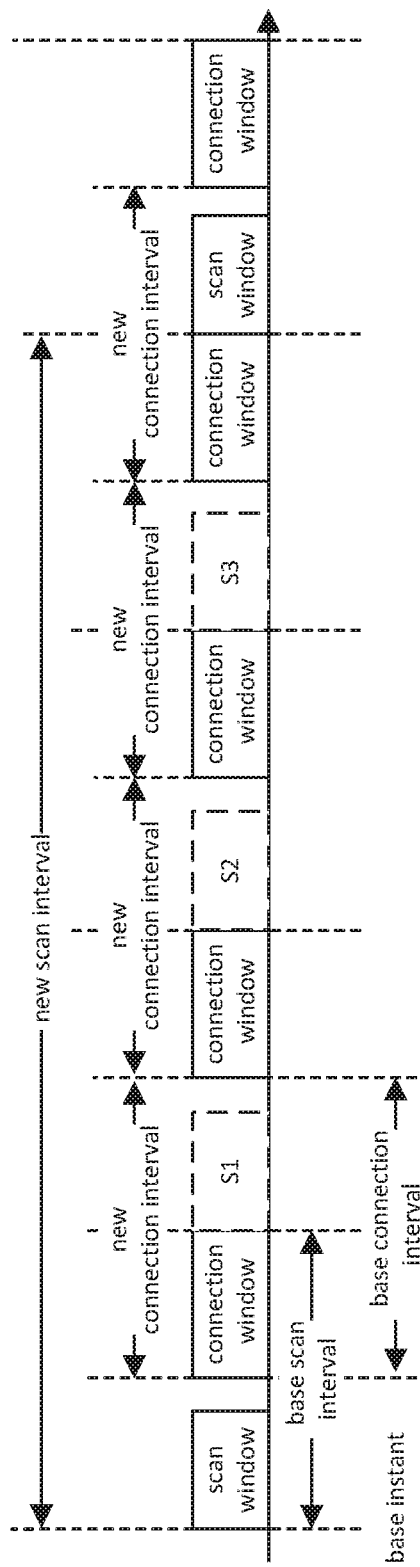
FIGS. 3A and 3B show timing diagrams illustrating working parameters for a method for managing one or more wireless connections in accordance with one or more embodiments of this disclosure.
Figure 3B:
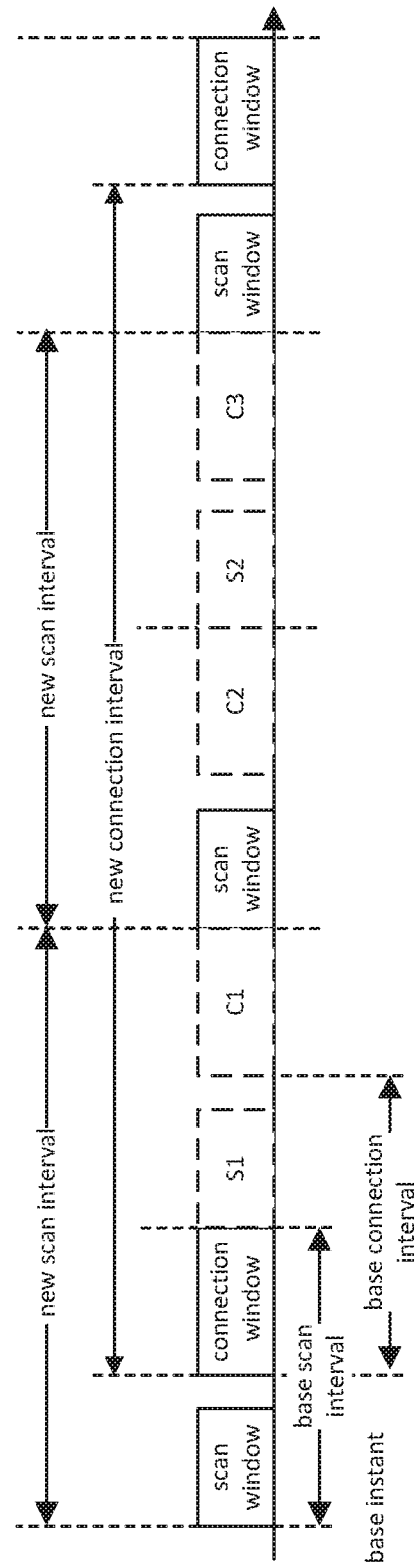

Actual working parameters may be determined by adjusting the static parameters according to specific needs. FIGS. 3A and 3B show timing diagrams illustrating working parameters for a method for managing one or more wireless connections in accordance with one or more embodiments of this disclosure. The procedure to set working parameters will be described below in greater details with reference to these drawings.

In one example, the wireless gateway may be a Bluetooth gateway and may receive from, for example, an Bluetooth Host Controller Interface (HCl), a control signal which may include initial parameters for connections, and the working parameters may be determined based on the control signal and the static parameters. In one example, the working parameters may be determined according to whether a Bluetooth connection has been established. If no connection has been established, a scan operation can be performed and no link operation is performed. The scan operation may be performed according to the initial parameters received from the HCl. If at least one connection has been established, the working parameters for the scan operations and the connection operations may be set based on the static parameters. In one example, among the working parameters, the new scan interval may be set to be a first integer multiplication of the scan interval in the static parameters, and the new connection interval may be set to be a second integer multiplication of the connection interval in the static parameters. The scan interval in the static parameters may be considered a "base interval". The first integer and the second integer may be same or different numbers, and this disclosure is not limited in this regard. The new scan window size and the new connection window size may remain the same as the scan window size and the connection window size in the static parameters, respectively.

FIGS. 3A and 3B each show one example of the timing diagram illustrating the working parameters. In the example show in FIG. 3A, after at least one connection has been established, the new scan interval is set to be four times of the base scan interval, and the new connection interval is set to be same as (one time of) the base connection interval. In the example shown in FIG. 3B, after at least one connection has been established, the new scan interval is set to be two times of the base scan interval, and the new connection interval is set to be four times of the base connection interval. Apparently, the examples shown above are just two possible sets of working parameters, other settings of the working parameters may be made according to specific needs, and this disclosure is not limited in this regard.

In FIGS. 3A and 3B, the dashed boxes S1, S2, S3, C1, C2, and C3 represent the locations of scan operations (scan windows) and connection operations (connection windows) that would otherwise been conducted had the static parameters been used. These scan operations and connections operations will be skipped when new scan interval and the new connection interval are used, and these dashed boxes are shown in the drawings for illustration and reference purposes.

Figure 4:
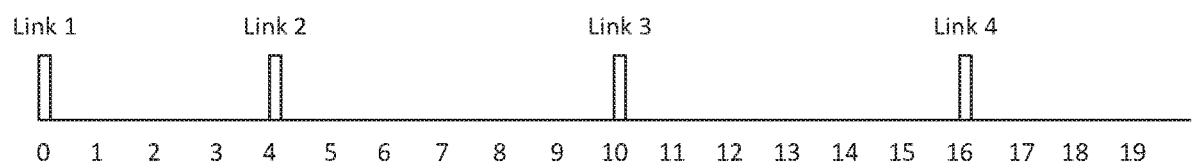
FIG. 4 shows an exemplary link position map in one connection window in a method for managing one or more wireless connections in accordance with one embodiment of this disclosure.

FIG. 4 shows an exemplary link position map in one connection window in a method for managing one or more wireless connections in accordance with one embodiment of this disclosure. In the example shown in FIG. 4, the wireless gateway is managing four wireless connections simultaneously. Correspondingly, a connection operation may include four link operations (Links 1-4 shown in FIG. 4), which are conducted in link positions 0, 4, 10, and 16, respectively. Each of these link positions are in an "occupied" status, while the rest of link positions are in an "unoccupied" status. When a new wireless connection is established, a new link operation corresponding to the new wireless connection may be conducted at one of "unoccupied" link positions, changing the status of that link position to the "occupied" status.

The wireless gateway may conduct the scan operation within the scan window to identify a new wireless connection. Existing operations for scanning wireless connection may be used as the scan operation, and this disclosure is not limited in this regard. Upon detecting a new wireless connection during the scan operation, the new wireless connection may be added to the connection operation. More specifically, a new wireless connection may be added by conducting a new link operation corresponding to the new connection at one of the plurality of link positions that is not occupied.

FIGS. 5A, 5B, 5C, 5D, and 5E are diagrams illustrating adding new connections without link position adjustment in a method for managing one or more wireless connections in accordance with one embodiment of this disclosure. The process to add one or more new connections will be described below with reference to these drawings.

Figure 5A:
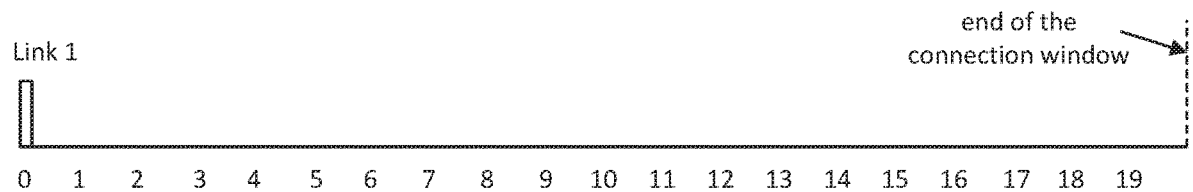
FIGS. 5A, 5B, 5C, 5D, and 5E show schematic diagrams illustrating adding new connections without link position adjustment in a method for managing one or more wireless connections in accordance with one embodiment of this disclosure.
Figure 5B:
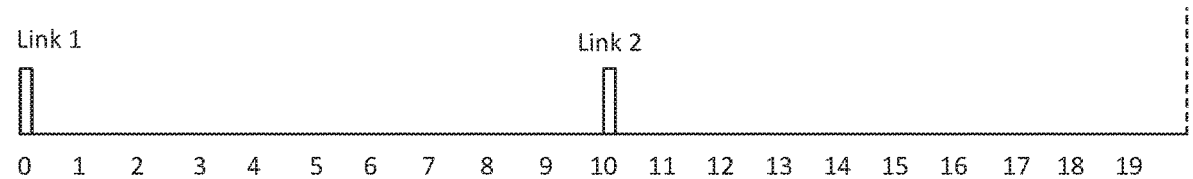
Figure 5C:
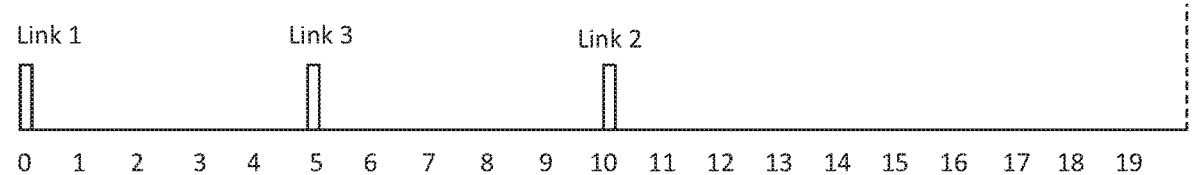
Figure 5D:
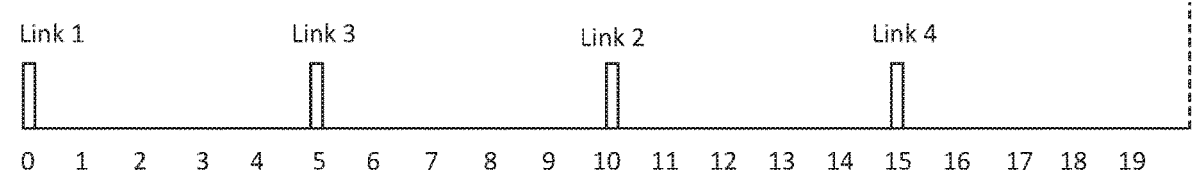
Figure 5E:
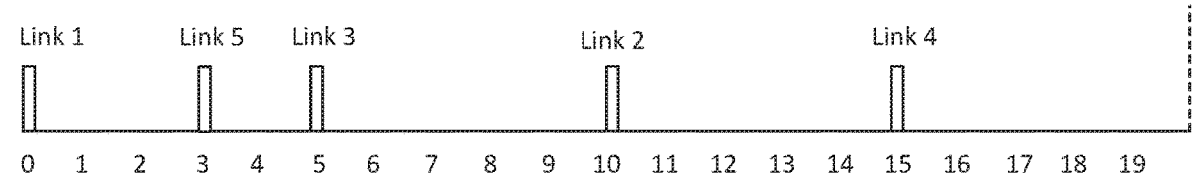

As shown in FIG. 5A, in one example, a wireless gateway may be capable of managing up to twenty wireless connections simultaneously, thus, a connection window may include twenty link positions (positions 0-19 in FIG. 5A) each corresponding to one wireless connection. As shown in FIG. 5A, the link operation (Link 1) corresponding to the first wireless connection may be added at first link position (position 0). As more wireless connections are established, new link operations corresponding to new wireless connections may be added to the connection operation. Each of the link operations will occupy one of the twenty link positions. In some embodiments, a new link operation may be added at a link position so that the intervals of consecutive link operations as well as the interval from the last link operation to the end of the connection window are substantially same. For ease of description, the intervals of consecutive link operations as well as the interval from the last link operation to the end of the connection window will be referred to as "operation intervals" of the connection window in the rest of this disclosure. By setting the operation intervals to be substantially same, each connection is assigned similar time slot resource. That avoids the unbalance distribution of the time slot resource where one link operation occupies a disproportionally large time slot resource, thereby adversely affecting time slot resource of other link operations.

In the examples shown in FIGS. 5B, 5C, 5D, and 5E, new link operations (Links 2, 3, 4, and 5), each corresponding to one wireless connection, may be added on unoccupied link positions. More specifically, the second link operation (Link 2) is added on the link position 10, the third link operation (Link 3) is added on the link position 5, the fourth link operation (Link 4) is added on the link position 15, and the fifth link position (Link 5) is added on the link position 3.

In some embodiments, the method for managing one or more wireless connection may further include adjusting the link positions for the link operations that have been conducted. More specifically, the link positions may be adjusted so that operation intervals of the connection window are substantially same, and relative orders of the link operations remain unchanged. In this disclosure, operation intervals are considered to be "substantially same" when the difference between any two operation intervals are no greater than the time interval between neighboring link positions of the connection window (i.e., one link interval shown in FIG. 2).

The link position adjustment may include the following steps. In one aspect, an average operation interval may be determined based on the total number link operations and the total number link positions within a connection window. The average operation interval may be an integer and may be expressed in term of the number of link positions between adjacent link operations. In another aspect, based on the computed average operation interval, the link positions for the link operations of the connection window may be adjusted.

FIGS. 6A, 6B, 6C, and 6D are diagrams illustrating the link position adjustment in a method for managing one or more wireless connections in accordance with one embodiment of this disclosure. The link position adjustment will be described below in details with reference to these drawings.

The average operation interval may first be determined. In this example, the total link positions is 20, and the total number link operations is 3. Thus, the average operation interval may be, in term of number of link position, 7 link positions (the nearest integer of 20/3). Then, the link positions for the link operations (i.e., Links 1, 2 and 3) may be adjusted based on the average operation interval. More specifically, as shown in FIGS. 6A, 6B, 6C, and 6D, the first link operation (Link 1) is first adjusted, followed by the third link operation (Link 3), and the second link operation (Link 2), respectively. Apparently, the link operations may be adjusted in other orders, and this disclosure is not limited in this regard. After the adjustment, the first operation (Link 1) may be moved to link position 0, the second link operation (Link 2) may be moved to link position 6, and the third link operation (Link 3) may be moved to link position 13. After these adjustments, the interval between the first and the second link operations (Links 1 and 2) is 6 link positions, the interval between the second and the third link operations (Links 2 and 3) is 7 link positions, and the interval between the third link operation (Link 3) and the end of the connection window is 7 link positions. Thus, these intervals are substantially the same after the adjustment.

Figure 6A:
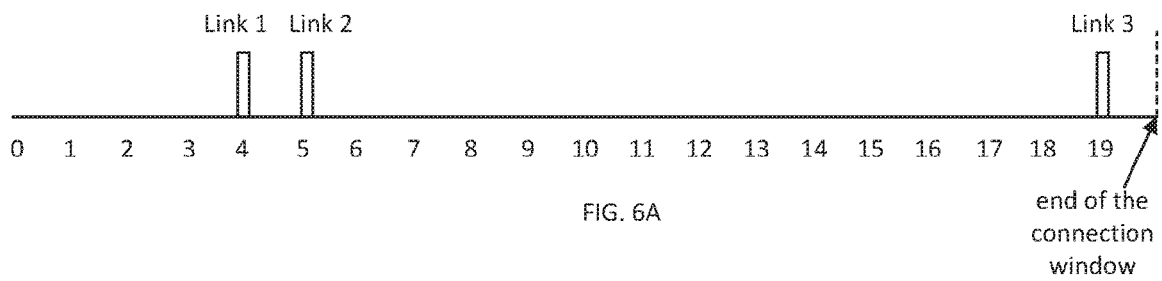
FIGS. 6A, 6B, 6C, and 6D show schematic diagrams illustrating the link position adjustment in a method for managing one or more wireless connections in accordance with one embodiment of this disclosure.
Figure 6B:
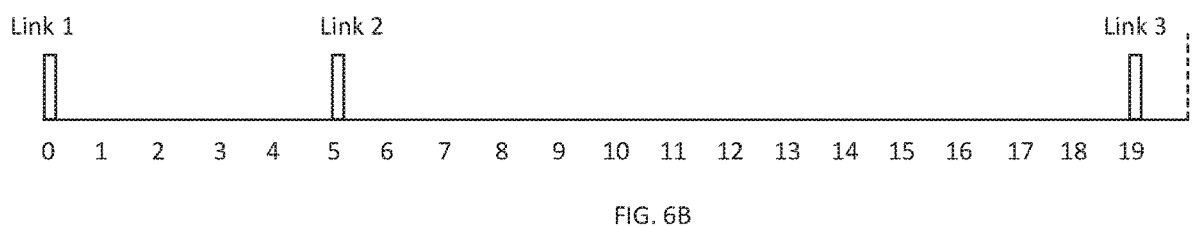
Figure 6C:
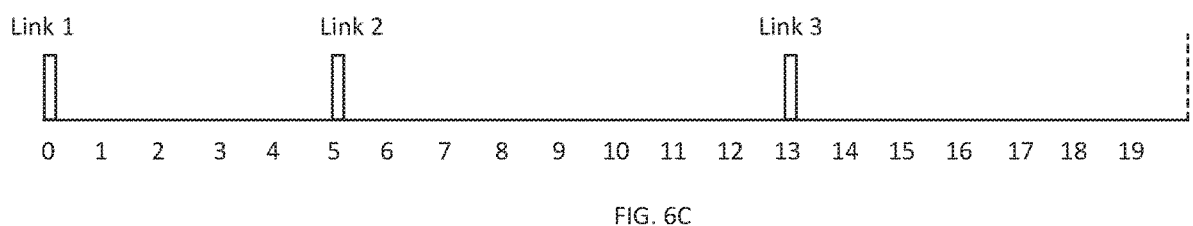
Figure 6D:
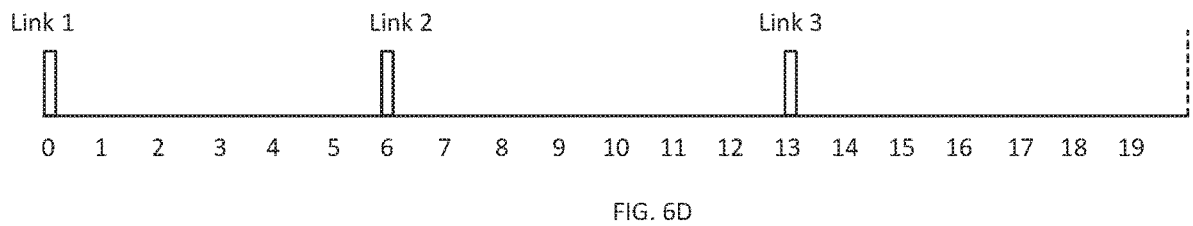

As shown in FIGS. 6A, 6B, 6C, and 6D, relative order of the link operations within the connection window may remain unchanged after the adjustment. That is, before the adjustment, the relative order of the link operations is Link 1, followed by Link 2, followed by Link 3, as shown in FIG. 6A. After the adjustment, the same relative order among these three link operations are maintained, as shown in FIG. 6D.

FIGS. 7A, 7B, 7C, 7D, 7E, and 7F show schematic diagrams illustrating adding new connections with link position adjustment in a method for managing one or more wireless connections in accordance with one embodiment of this disclosure. Specific procedures of adding new connection with link position adjustment will be described below with reference to these drawings.

Figure 7A:
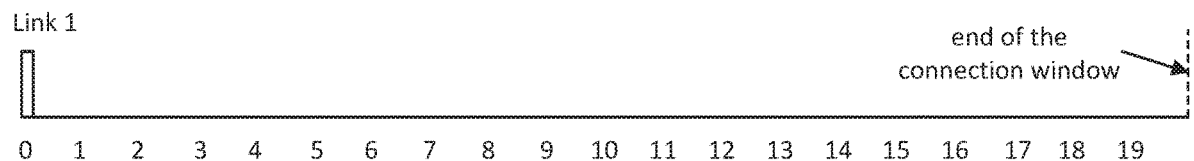
FIGS. 7A, 7B, 7C, 7D, 7E, and 7F show schematic diagrams illustrating adding new connections with link position adjustment in a method for managing one or more wireless connections in accordance with one embodiment of this disclosure.
Figure 7B:
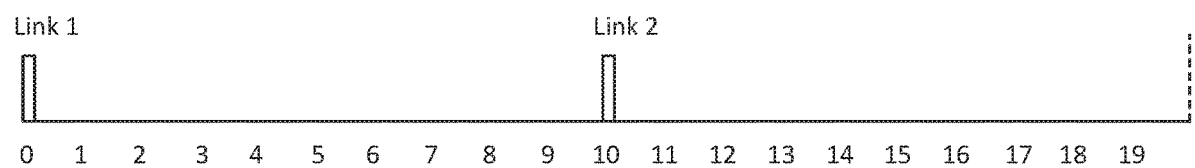
Figure 7C:
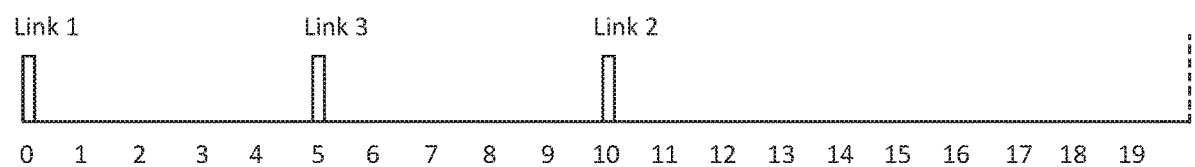
Figure 7D:
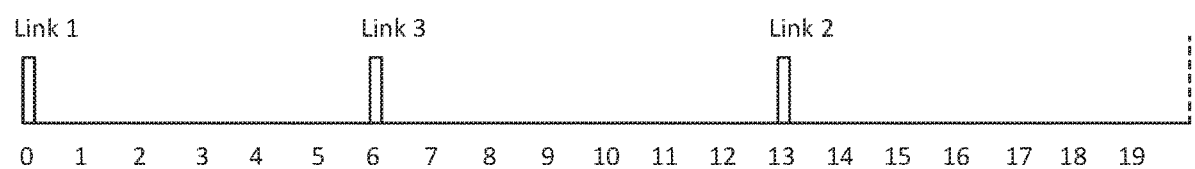
Figure 7E:
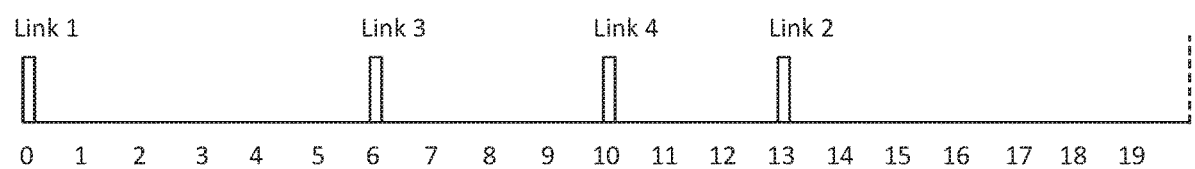
Figure 7F:
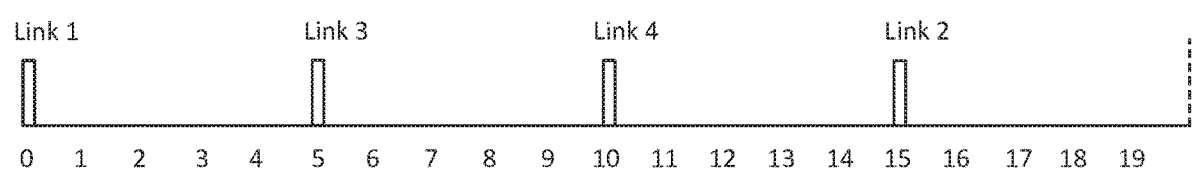

When one link (Link 1) is to be established, the link operation can be conducted at link position 0 as shown in FIG. 7A. Subsequently, when a second link (Link 2) is to be added, the link operation for Link 2 can be conducted at a position that evenly or substantially evenly divides the connection window between link position 0 and the end of the connection window. As shown in FIGS. 7A and 7B, the first link operation (Link 1) may be added at link position 0, and the second link operation (Link 2) may be added at link position 10. No link position adjustment is needed while adding these two link operations. As shown in FIG. 7C, the third link operation (Link 3) may be added between Link 1 and Link 2, such as at link position 5. After the third link operation is added, a link position adjustment may be performed so that the operation intervals of the connection window become substantially the same. The aforementioned link position adjustment procedure may be used to adjust the link positions. After the adjustment, the three link operations may be positioned at link positions 0, 6, and 13, respectively, as shown in FIG. 7D. Subsequently, a fourth link operation (Link 4) may be added between Link 2 and Link 3, such as at link position 10, as shown in FIG. 7E, and a link position adjustment may be performed. After the adjustment, the four link operations may be positioned at link positions, 0, 5, 10, and 15, respectively, as shown in FIG. 7F.

As show in the aforementioned example, after the link position adjustment, the operation intervals are substantially the same. The adjustment avoids the situation where one link operation occupies a disproportionally large time slot, which may adversely affect other link operations. Thus, the interference between the connections may be minimized, and the performance of each connection may be improved. Additionally, through link position adjustment, the operation intervals of the connection window maybe estimated based on the total number of connections, thus the throughput of each connection may be estimated.

In some embodiments, to avoid frequent adjustment of link positions, one or more thresholding conditions may be checked before adjusting the link positions for the link operations in connection windows.

For example, an adjustment period, which is a time period since the link positions are last adjusted, may be compared with a time threshold. The adjustment may be conducted when the adjustment period is longer than the time threshold.

In another example, an adjustment counter, which is the number of adjustments that have been conducted, may be set. The adjustment may be conducted when the adjustment counter is less than a counter threshold. The adjustment counter may be reset every preset period of time.

The time threshold and the counter threshold may be set according to specific needs, and this disclosure is not limited in these regards.

In yet another example, a total adjustment interval may be determined before the adjustment is performed. The total adjustment interval may be a total amount of link position adjustment need to be conducted, and may be expressed in term of the number of link positions. For example, as shown in FIGS. 6A, 6B, 6C, and 6D, the link positions for three link operations are adjusted. Link 1 is moved from link position 4 to link position 0, resulting in an adjustment of 4 link positions. Link 2 is moved from link position 5 to link position 6, resulting in an adjustment of 1 link position. Link 3 is moved from link position 19 to link position 13, resulting in an adjustment of 6 link positions. Thus, the total adjustment interval is 11 link positions.

The total adjustment interval may be determined before the adjustment is conducted, and may be compared with an interval threshold. The adjustment may be conducted when the total adjustment interval is greater than the interval threshold.

Apparently, the aforementioned conditions are some exemplary conditions that can be set to determine whether an adjustment is to be performed, and do not mean to be limiting. Other conditions may be set according to specific needs, and this disclosure is not limited in this regard.

Additionally or alternatively, two or more conditions may be combined to determine whether an adjustment can be conducted. For example, in one embodiment, the adjusting the link positions for the link operations that have been conducted may include: determining whether the adjustment period is greater than the time threshold and the adjustment counter is less than the counter threshold; and in response to determining that the adjustment period is greater than the time threshold and the adjustment counter is less than the counter threshold, adjusting the link positions of the link operations.

The link position adjustment process described above refers to an example in which new connections are added.

The link position adjustment can also be conducted after one or more existing connections are removed.

More specifically, the conducting the connection operation within the connection window may further comprise: removing one of the one or more wireless connections by removing the link operation corresponding to the removed wireless connection; and adjusting link positions of the remaining link operations.

The adjusting link positions of the remaining link operations may include adjusting the link positions of the remaining link operations, so that operation intervals of the connection window are substantially the same. Relative orders of the link operations may remain unchanged after the adjustment.

More specifically, the adjusting the link positions of the remaining link operations may further include: determining whether the adjustment period is greater than the time threshold and the adjustment counter is less than a counter threshold. The adjustment period may be a time period since the link positions are last adjusted, and the adjustment counter may be the number of link positions that have been adjusted. The adjusting the link positions of the remaining link operations may further include: in response to determining that the adjustment period is greater than the time threshold and the adjustment counter is less than the counter threshold, adjusting the link positions of the remaining link operations.

Relevant parts in the descriptions related to the link operation adjustment when new connection is added may be referred to for details of the link operation adjustment, which will not be repeated here for the sake of conciseness.

In the method for managing one or more wireless connections provided in this disclosure. The scan interval and the connection interval may each be an integer multiplication of a base interval, and the scan windows and the connection windows are separated from each other. Thus, the interference between the scan operations and the connection operations may be minimized. Each connection window may include a plurality of link positions substantially equally spaced from each other, each corresponding to one wireless connection. When a new connection is established, the new connection may be assigned a link position on the basis that the operation intervals of the connection window are substantially same. Additionally, when a new connection is established or an existing connection is removed, the link positions corresponding to the connections may be adjusted so that the operation intervals of the connection window are substantially the same. Relative orders of the link operations may remain unchanged after the adjustment. Thus, the interference between the connections may be minimized, the performance of each connection may be improved, and the throughput of each connection can be estimated.

Based on the method of managing one or more wireless connections presented above, this disclosure further provides a wireless gateway. The wireless gateway may include a processor and a memory configured to store computer instruction executable by the processor to cause the processor to perform a method for managing one or more wireless connections. The method may include: conducting a plurality of scan operations and a plurality of connection operations. Each scan operation may be conducted within one of a plurality of scan windows each having a scan window size, and each connection operation may be conducted within one of a plurality of connection windows each having a connection window size.

The scan windows and the connection windows may be separated from each other. Consecutive scan windows may be separated by a scan interval, and consecutive connection windows may be separated by a connection interval. The scan interval may be a first integer multiplication of a base interval, and the connection interval may be a second integer multiplication of the base interval. Each connection window may include a plurality of link positions each corresponding to one of the one or more wireless connections.

In some embodiments, the scan operations and the connection operations may be conducted alternately, and the scan interval equals to the connection interval.

In some embodiments, within each connection window, each of the plurality of link positions may have a same span size, and consecutive link positions may be separated by a same link separation. And the conducting the connection operation within the connection window may include: conducting one or more link operations, each conducted at one of the plurality of link positions, causing the corresponding link position being occupied. Each link operation may correspond to one of the one or more wireless connections.

In some embodiments, the conducting the scan operation within the scan window may include: conducting the scan operation to identify a new wireless connection. And the conducting the connection operation within the connection window may further include: adding the new wireless connection. The new wireless connection may be added by: conducting a new link operation corresponding to the new wireless connection at one of the plurality of link positions that is not occupied; and adjusting the link positions for the link operations that have been conducted.

In some embodiments, the adjusting the link positions for the link operations that have been conducted may include: adjusting the link positions so that operation intervals of the connection window are substantially the same. The operation intervals of the connection window may include intervals between consecutive link operations as well as the interval from the last link operation to the end of the connection window. Relative orders of the link positions may remain unchanged after the adjustment.

In some embodiments, the adjusting the link positions for the link operations that have been conducted may further include: determining whether an adjustment period is greater than a time threshold and an adjustment counter smaller than a counter threshold; and in response to determining that the adjustment period is greater than the time threshold and the adjustment counter is less than the counter threshold, adjusting the link positions. The adjustment period may be a time period since the link positions are last adjusted, and the adjustment counter may be a number of link positions that have been adjusted.

In some embodiments, the conducting the connection operation within the connection window may further include: removing one of the one or more wireless connections. The one or more wireless connections may be removed by: removing the link operation corresponding to the removed wireless connection; and adjusting link positions the remaining link operations.

In some embodiments, the adjusting link positions of the remaining link operations may include: adjusting the link positions so that operation intervals of the connection window are substantially the same. Relative orders of the link operations may remain unchanged after the adjustment.

In some embodiments, the adjusting the link positions of the remaining link operations may further include: determining whether the adjustment period is greater than the time threshold and the adjustment counter is less than the counter threshold; and in response to determining that the adjustment period is greater than the time threshold and the adjustment counter is less than the counter threshold, adjusting the link positions of the remaining link operations. The adjustment period may be a time period since the link positions are last adjusted, and the adjustment counter may be the number of link positions that have been adjusted.

Relevant descriptions in the method embodiments may be referred to for details of the method, which will not be repeatedly described herein for the sake of conciseness.

Based on the method of managing one or more wireless connections presented above, this disclosure further provides a non-transitory computer-readable storage medium storing a computer program. Upon being executed by a processor, the computer program may cause the processor to perform a method for managing one or more wireless connections. The method may be applicable to a wireless gateway and may include: conducting, by the wireless gateway, a plurality of scan operations and a plurality of connection operations. Each scan operation may be conducted within one of a plurality of scan windows each having a scan window size, and each connection operation may be conducted within one of a plurality of connection windows each having a connection window size.

The scan windows and the connection windows may be separated from each other. Consecutive scan windows may be separated by a scan interval, and consecutive connection windows may be separated by a connection interval. The scan interval may be a first integer multiplication of a base interval, and the connection interval may be a second integer multiplication of the base interval. Each connection window may include a plurality of link positions each corresponding to one of the one or more wireless connections.

In some embodiments, the scan operations and the connection operations are conducted alternately, and the scan interval equals to the connection interval.

Relevant descriptions in the method embodiments may be referred to for details of the method, which will not be repeatedly described herein for the sake of conciseness.

Figure 8:
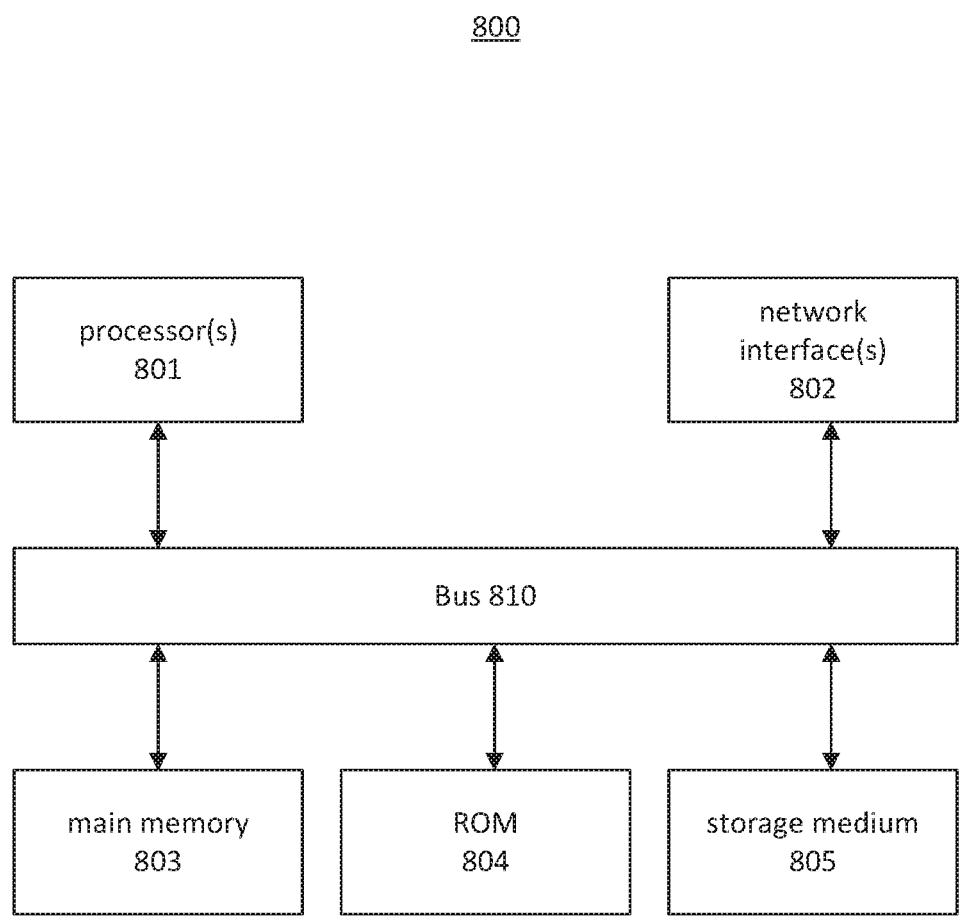
FIG. 8 show a schematic diagram illustrating a computer system upon which any of the embodiments described herein may be implemented.

FIG. 8 shows a schematic diagram illustrating a computer system upon which any of the embodiments described herein may be implemented. Various devices described in this disclosure, such as devices associated with the wireless gateway, may be at least partially implemented as such a computer system 800. The computer system 800 may include a bus 810 or other communication mechanism for communicating information, one or more hardware processors 801 coupled with the bus 810 for processing information. Hardware processor(s) 801 may be, for example, one or more general purpose microprocessors.

The computer system 800 may also include a main memory 803, such as a random access memory (RAM), cache and/or other dynamic storage devices, coupled to the bus 810 for storing information and instructions to be executed by processor(s) 801. Main memory 803 may be used for storing temporary variables or other intermediate information during execution of instructions to be executed by processor(s) 801. Such instructions, when stored in storage media accessible to processor(s) 801, may render computer system 800 into a special-purpose machine that is customized to perform the operations specified in the instructions. For example, upon being executed by the processor(s) 801, the instructions may cause the processor(s) 801 to perform the method described in any of the aforementioned embodiments.

Main memory 803 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 801 executing one or more sequences of one or more instructions contained in main memory 803. Such instructions may be read into main memory 803 from another storage medium, such as a storage medium 805. Execution of the sequences of instructions contained in main memory 803 causes processor(s) 801 to perform the process steps described herein.

The computer system 800 also includes a network interface 802 coupled to the bus 810. The network interface 802 may provide a two-way data communication coupling to one or more network links that are connected to one or more networks. In another example, the network interface 802 may be a local area network (LAN) card to provide a data communication connection to a compatible LAN (or WAN component to communicated with a WAN). Wireless links may also be implemented.

The method, system, computer-readable storage medium, and computer system for managing one or more wireless connection are disclosed. In the method for managing one or more wireless connections, the scan operations and the connection operations are performed in their respective operation windows that are not overlapped, and each individual connection is assigned substantially same time slot resource. Thus, the interference between the scan operation and the connection operation is minimized, and the accessibilities of individual connections are maintained substantially consistent. Additionally, when a new connection is added or an existing connection is removed, the link positions corresponding to the wireless connections are adjusted to provide substantially balance distribution of the time slot resource for each individual connection. Thus, the performances of individual connections are maintained consistent, and the throughput of each individual connection can be accurately estimated.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. A time division multiplexing method for managing one or more wireless connections, applicable to a wireless gateway, the method comprises:
    conducting, by the wireless gateway, a plurality of scan operations and a plurality of connection operations, each scan operation conducted within one of a plurality of scan windows each having a scan window size, each connection operation conducted within one of a plurality of connection windows each having a connection window size,
    wherein the scan windows and the connection windows are separated from each other, consecutive scan windows are separated by a scan interval, consecutive connection windows are separated by a connection interval, the scan interval is a first integer multiplication of a base interval, and the connection interval is a second integer multiplication of the base interval, and
    wherein each connection window includes a plurality of link positions each corresponding to one of the one or more wireless connections, and, within each connection window, each of the plurality of link positions has a same span size, and consecutive link positions are separated by a same link separation, and
    wherein, to conduct each connection operation within one of the plurality of connection windows, the method comprises:
        conducting one or more link operations, each of the one or more link operations being conducted at a corresponding link position of the plurality of link positions, causing the corresponding link position being occupied, wherein each of the one or more link operations corresponds to one of the one or more wireless connections.

2. The method of claim 1, wherein the scan operations and the connection operations are conducted alternately, and the scan interval equals to the connection interval.

3. The method of claim 1, wherein, to conduct each scan operation within one of the plurality of scan windows, the method comprises:
    conducting the scan operation to identify a new wireless connection, and
    wherein, to conduct each connection operation within one of the plurality of connection windows, the method further comprises:
    adding the new wireless connection by:
        conducting a new link operation corresponding to the new wireless connection at one of the plurality of link positions that is not occupied; and
        adjusting the link positions for the link operations that have been conducted.

4. The method of claim 3, wherein the adjusting the link positions for the link operations that have been conducted comprises:
    adjusting the link positions so that operation intervals of a corresponding connection window of the plurality of connection windows are substantially the same, and relative orders of the link positions remain unchanged, wherein the operation intervals of the corresponding connection window include intervals between consecutive link operations and an interval from the last link operation to an end of the corresponding connection window.

5. The method of claim 4, wherein the adjusting the link positions for the link operations that have been conducted further comprises:
    determining whether an adjustment period is greater than a time threshold and an adjustment counter is less than a counter threshold, wherein the adjustment period is a time period since the link positions are last adjusted, and the adjustment counter is a number of link positions that have been adjusted; and
    in response to determining that the adjustment period is greater than the time threshold and the adjustment counter is less than the counter threshold, adjusting the link positions.

6. The method of claim 1, wherein, to conduct each connection operation within one of the plurality of connection windows, the method further comprises:
    removing one of the one or more wireless connections by:
        removing a link operation corresponding to the removed wireless connection; and
        adjusting link positions of the remaining link operations.

7. The method of claim 6, wherein the adjusting link positions of the remaining link operations comprises:
    adjusting the link positions of the remaining link operations so that operation intervals of a corresponding connection window of the plurality of connection windows are substantially the same, and relative orders of the link positions of the remaining link operations remain unchanged, wherein the operation intervals of the corresponding connection window include intervals between consecutive link operations and an interval from the last link operation to an end of the corresponding connection window.

8. The method of claim 7, wherein the adjusting the link positions of the remaining link operations further comprises:
    determining whether an adjustment period is greater than a time threshold and an adjustment counter is less than a counter threshold, wherein the adjustment period is a time period since the link positions are last adjusted, and the adjustment counter is a number of link positions that have been adjusted; and
    in response to determining that the adjustment period is greater than the time threshold and the adjustment counter is less than the counter threshold, adjusting the link positions of the remaining link operations.

9. A wireless gateway, comprising:
    a processor; and
    a memory configured to store computer instructions executable by the processor to cause the processor to perform operations, comprising:
    conducting a plurality of scan operations and a plurality of connection operations, each scan operation conducted within one of a plurality of scan windows each having a scan window size, each connection operation conducted within one of a plurality of connection windows each having a connection window size,
    wherein the scan windows and the connection windows are separated from each other, consecutive scan windows are separated by a scan interval, consecutive connection windows are separated by a connection interval, the scan interval is a first integer multiplication of a base interval, and the connection interval is a second integer multiplication of the base interval, and wherein each connection window includes a plurality of link positions each corresponding to one of the one or more wireless connections, and, within each connection window, each of the plurality of link positions has a same span size, and consecutive link positions are separated by a same link separation, and wherein, to conduct each the connection operation within one of the plurality of connection windows, the operations comprise:

conducting one or more link operations, each of the one or more link operations being conducted at a corresponding link position of the plurality of link positions, causing the corresponding link position being occupied, wherein each of the one or more link operations corresponds to one of the one or more wireless connections.

10. The wireless gateway of claim 9, wherein the scan operations and the connection operations are conducted alternately, and the scan interval equals to the connection interval.

11. The wireless gateway of claim 9, wherein to conduct each scan operation within one of the plurality of scan windows, the operations comprise:

conducting the scan operation to identify a new wireless connection, and wherein, to conduct each connection operation within one of the plurality of connection windows, the operations further comprise:

adding the new wireless connection by:

conducting a new link operation corresponding to the new wireless connection at one of the plurality of link positions that is not occupied; and adjusting the link positions for the link operations that have been conducted.

12. The wireless gateway of claim 11, wherein the adjusting the link positions for the link operations that have been conducted comprises:

adjusting the link positions so that operation intervals of a corresponding connection window of the plurality of connection windows are substantially the same, and relative orders of the link positions remain unchanged, wherein the operation intervals of the corresponding connection window include intervals between consecutive link operations as well as the interval from the last link operation to an end of the corresponding connection window.

13. The wireless gateway of claim 12, wherein the adjusting the link positions for the link operations that have been conducted further comprises:

determining whether an adjustment period is greater than a time threshold and an adjustment counter smaller than a counter threshold, wherein the adjustment period is a time period since the link positions are last adjusted, and the adjustment counter is a number of link positions that have been adjusted; and in response to determining that the adjustment period is greater than the time threshold and the adjustment counter is less than the counter threshold, adjusting the link positions.

14. The wireless gateway of claim 9, wherein, to conduct each connection operation within one of the plurality of connection windows, the operations further comprise:

removing one of the one or more wireless connections by:

removing the link operation corresponding to the removed wireless connection; and adjusting link positions the remaining link operations.

15. The wireless gateway of claim 14, wherein the adjusting link positions of the remaining link operations comprises:

adjusting the link positions of the remaining link operations so that operation intervals of a corresponding connection window of the plurality of connection windows are substantially the same, and relative orders of the link positions of the remaining link operations remain unchanged, wherein the operation intervals of the corresponding connection window include intervals between consecutive link operations and an interval from the last link operation to an end of the corresponding connection window.

16. The wireless gateway of claim 15, wherein the adjusting the link positions of the remaining link operations further comprises:

determining whether an adjustment period is greater than a time threshold and an adjustment counter is less than a counter threshold, wherein the adjustment period is a time period since the link positions are last adjusted, and the adjustment counter is a number of link positions that have been adjusted; and in response to determining that the adjustment period is greater than the time threshold and the adjustment counter is less than the counter threshold, adjusting the link positions of the remaining link operations.

17. A non-transitory computer-readable storage medium storing a computer program, wherein, upon being executed by a processor, the computer program causes the processor to perform operations, comprising:

conducting, by the wireless gateway, a plurality of scan operations and a plurality of connection operations, each scan operation conducted within one of a plurality of scan windows each having a scan window size, each connection operation conducted within one of a plurality of connection windows each having a connection window size, wherein the scan windows and the connection windows are separated from each other, consecutive scan windows are separated by a scan interval, consecutive connection windows are separated by a connection interval, the scan interval is a first integer multiplication of a base interval, and the connection interval is a second integer multiplication of the base interval, and wherein each connection window includes a plurality of link positions each corresponding to one of the one or more wireless connections, and, within each connection window, each of the plurality of link positions has a same span size, and consecutive link positions are separated by a same link separation, and wherein, to conduct each connection operation within one of the plurality of connection windows, the operations comprise:

conducting one or more link operations, each of the one or more link operations being conducted at a corresponding link position of the plurality of link positions, causing the corresponding link position being occupied, wherein each of the one or more link operations corresponds to one of the one or more wireless connections.

18. The non-transitory computer-readable storage medium of claim 17, wherein the scan operations and the connection operations are conducted alternately, and the scan interval equals to the connection interval.

* * * * *